United States Patent [19]

Pritchard

[11] 4,404,584

[45] * Sep. 13, 1983

[54] SIGNAL PROCESSING APPARATUS EFFECTING ASYMMETRICAL VERTICAL PEAKING

[75] Inventor: Dalton H. Pritchard, Princeton, N.J.

[73] Assignee: RCA Corporation, New York, N.Y.

[*] Notice: The portion of the term of this patent subsequent to Jun. 20, 1995, has been disclaimed.

[21] Appl. No.: 443,926

[22] Filed: Nov. 23, 1982

Related U.S. Application Data

[63] Continuation of Ser. No. 38,283, May 11, 1979, abandoned.

[51] Int. Cl.³ .............................................. H04N 9/535
[52] U.S. Cl. ...................................................... 358/31
[58] Field of Search ..................................... 358/31, 37

[56] References Cited

U.S. PATENT DOCUMENTS

| | | | |
|---|---|---|---|
| 3,732,360 | 5/1973 | Breimer et al. | 358/37 |
| 3,798,353 | 3/1974 | Illetschko | 358/37 |
| 3,919,470 | 11/1975 | Blom et al. | 358/37 |
| 4,096,516 | 6/1978 | Pritchard | 358/31 |
| 4,136,358 | 1/1979 | Clemens et al. | 358/11 |
| 4,205,335 | 6/1980 | Nakagawa et al. | 358/31 |

OTHER PUBLICATIONS

Metzger, "Comb filter", *Research Disclosure*, No. 153, pp. 34–35, Jan. 1977.
Barton, "A Practical Charge-Coupled Device Filter for the Separation of Luminance and Chrominance Signals in a Television Receiver", *IEEE Transactions on Consumer Electronics*, vol. CE-23, No. 3, Aug. 1977, pp. 342–357.

*Primary Examiner*—John C. Martin
*Attorney, Agent, or Firm*—Eugene M. Whitacre; William H. Meagher

[57] ABSTRACT

First 1-H type comb filter provides an output representative of the sum of current line video signals and preceding line video signals, which is delivered to an adder via a wideband signal path, as a wideband combed luminance signal input occupying a given band of frequencies. Second 1-H type comb filter provides an output representative of the difference between current line video signals and preceding line video signals which is delivered to said adder, via a signal path with a pass band restricted to only a low frequency portion of the given band, as a restricted band vertical detail signal input. Latter signal path translates at least portions of said vertical detail signal with a gain which is enhanced relative to the gain with which said combed luminance signal components are translated by said wideband signal path, and delivers said difference representative output with such polarity that the current line video signal contribution to said difference appears at the adder with the same polarity as the constituents of the sum representative output delivered thereto. The adder output forms a luminance signal with an asymmetrical form of vertical peaking in which overshoots only appear at transitions in the direction of vertical scanning of the black-to-white type, and undershoots only appear at transitions in the direction of vertical scanning of the white-to-black type.

6 Claims, 1 Drawing Figure

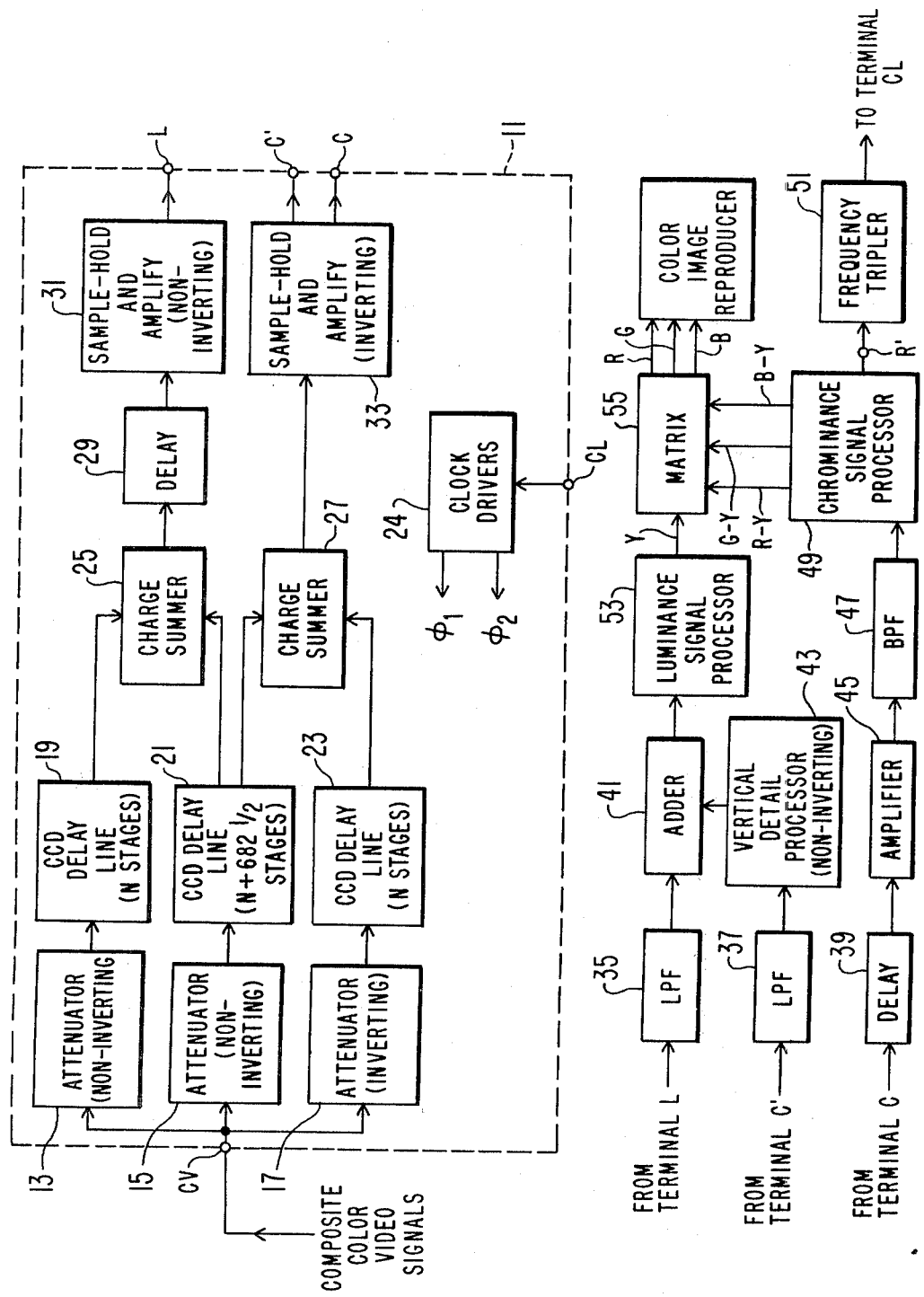

SIGNAL PROCESSING APPARATUS EFFECTING ASYMMETRICAL VERTICAL PEAKING

This is a continuation, of application Ser. No. 38,283, filed May 11, 1979 now abandoned.

The present invention relates generally to signal processing apparatus for color television signals, and particularly to novel forms of such apparatus for effecting enhancement of vertical detail in a reproduced color image in an asymmetrical manner introducing an overhead lighting effect which is subjectively pleasing.

In U.S. Pat. No. 4,096,516—Pritchard, a charge coupled device (CCD) comb filter arrangement is described which is particularly well suited for separating the luminance and chrominance signal components of a composite color television signal. Parallel signal paths formed by long and short CCD delay lines, using a common clock drive and terminating in a common charge summer, are provided. In an illustrative embodiment suitable for processing standard NTSC broadcast signals, clocking at a frequency equal to three times the color subcarrier frequency (i.e., equal to $3 \times 3.579545$ MHz., or 10.738635 MHz.) is employed to control charge transfer in a long, two phase delay line of $683\frac{1}{2}$ stages and a pair of short, two phase delay lines of one stage each. Summing of charge transferred by the long delay line and one of the short delay lines is used to obtain a first comb filter characteristic exhibiting regularly spaced rejection notches at odd integral multiples of half the line frequency; a combed luminance signal is derived from the output of the first charge summer. Summing of charge transferred by the long delay line and by the other of the short delay lines (the input of which is subject to phase inversion) is used to obtain a second comb filter characteristic exhibiting regularly spaced rejection notches at even integral multiples of half the line frequency. With suitable bandpass filtering, a combed chrominance signal is derived from an output of the second charge summer. With suitable lowpass filtering, a vertical detail signal may also be derived from an output of the second charge summer for recombination with the combed luminance signal derived from the first charge summer.

With the vertical detail information thus separately accessible in a receiver employing the above-described comb filter arrangement, an opportunity is presented for introducing, in the receiver itself, "vertical peaking," i.e., enhancement of the vertical detail content of the luminance component to increase the apparent vertical sharpness or resolution in the picture. So-called vertical aperture correctors are well-known for use by broadcasters in introducing such vertical peaking prior to broadcast of signals. The conventional vertical aperture corrector, however, employs a 2-H type comb filter (using two 1-H delay lines) in order to provide symmetrical vertical peaking so that both "undershoots" and "overshoots" will be associated with both black-to-white and white-to-black transitions in the direction of vertical scanning.

In accordance with the principles of the present invention, a vertical detail enhancement system is provided wherein vertical detail information, obtained from a 1-H comb filter is relatively enhanced and then recombined with a combed luminance signal, also derived from a 1-H type comb filter, with a polarity relationship chosen to introduce a form of asymmetrical vertial peaking in which: (a) "overshoots" are only associated with black-to-white transitions in the direction of vertical scanning; and (b) "undershoots" are only associated with white-to-black transitions in the direction of vertical scanning. As a consequence, there is associated with the improvement of apparent vertical sharpness, an introduction of an effect of lighting of the scene from above, with highlights on upper edges of bright objects and shadows beneath. The effect is subjectively pleasing, being in harmony with the viewer's real-life experience, in which most scenes that have been viewed, whether indoors or outdoors, were subject to lighting from above.

In the sole FIGURE of the drawing, there is illustrated, by block diagram representation, a portion of a color television receiver incorporating a vertical detail enhancement system in accordance with an embodiment of the present invention.

In the illustrated arrangement, composite color video signals, developed by the video detector of a color television receiver, are applied to the composite video input terminal CV of CCD comb filter circuitry 11 of the general type shown in the aforementioned Pritchard patent. The circuitry 11, enclosed by a dashed line in the drawing, may conveniently be fabricated on a single monolithic integrated circuit.

The circuitry 11 includes a trio of attenuators (non-inverting attenuators 13 and 15, and inverting attenuator 17), responsive to the signals at terminal CV, for delivering composite video signal inputs to respective CCD delay lines: short delay line 19 (N stages); long delay line 21 (N+$682\frac{1}{2}$ stages); and short delay line 23 (N stages). The delay lines are subject to two-phase clocking, effected by clocking signals ($\phi_1, \phi_2$) of a frequency (10.738635 MHz.) equal to three times the color subcarrier frequency (3.579545 MHz.), as developed by clock drivers 24 receiving a clock control signal of appropriate frequency at clock control input terminal CL. In an illustrative realization of circuitry 11, the short delay lines 19 and 23 comprise one delay stage each, while the long delay line 21 comprises $683\frac{1}{2}$ stages. The difference in delays of the outputs of delay lines 19 and 21 corresponds to a period (63.555 microseconds) at the line frequency of the composite video signals, as does the difference in delays of the outputs of delay lines 21 and 23.

The transferred charge output of short delay line 19 is summed with a transferred charge output of the long delay line 21 in a first charge summer 25. The transferred charge output of short delay line 23 is summed with a transferred charge output of the long delay line 21 in a second charge summer. Reference may be made to the copending U.S. patent application, Ser. No. 930,379, of J. Carnes, et al. for a description of preferred structures for implementing the functions of the charge summers (25, 27) and the delay lines (19, 21, 23), and for inputting signals to the latter elements.

If the less delayed signal output of short delay line 19 is viewed as representing "current line" information, it is apparent that the more delayed signal output of long delay line 21 corresponds to "preceding line" information, in view of the 1-H interval difference in delays. With like (non-inverting) processing of the inputs to these delay lines, charge summer 25 effects a true addition of "current line" and "preceding line" signals. Such addition results in formation of a comb filter of the type exhibiting a response characteristic with rejection notches at odd integral multiples of half the line frequency. The baseband component of the output of the first charge summer 25 thus comprises a combed luminance signal, freed of interleaved chrominance signal components, (but also suffering the loss of vertical detail information).

In contrast, as a consequence of the unlike processing of signal inputs to delay lines 21 and 23, the second charge summer 27 provides an effective subtraction operation for the adjacent line signals. Such subtraction results in formation of a comb filter of the type exhibiting a response characteristic with rejection notches at even, integral multiples of half the line frequency. The baseband component of the output of the second charge summer 27 thus comprises a combed chrominance signal, freed of interleaved high frequency luminance signal components (but accompanied by lower frequency vertical detail signals).

The output of the second charge summer 27 is supplied to a sample-hold and amplify unit 33, for signal translation in a manner effecting an elevation of the level of the combed baseband image-representative signal components of the summer 27 output relative to the companion higher frequency components corresponding to clocking signals, harmonics thereof, and sideband components associated therewith. As noted in a drawing legend, such signal translation is effected in unit 33 with a net polarity inversion of the baseband components delivered to the output terminals (C, C') thereof.

The output of the first charge summer 25 is also supplied to a sample-hold and amplify unit (31), which has a function similar to that described for unit 33. The signal delivery, however, is effected via a delay unit 29 (illustratively comprising two clocked delay stages), which serves a filter delay compensating purpose to be subsequently explained. As indicated by a drawing legend, signal translation is effected in unit 31 in a non-inverting manner for delivery to the unit output terminal L; this is in contrast with the inverting translation of signals in unit 33.

Signals appearing at terminal L are applied to a low pass filter 35. With an illustrative passband of 0 to 4 MHz., filter 35 passes a wideband combed luminance signal, while rejecting the higher frequency components associated with the clocking signals. The output of low pass filter 35 is supplied to an adder 41 for recombination with vertical detail information.

Vertical detail information is selectively passed by a low pass filter 37 coupled to terminal C'. The cut-off frequency (e.g., 1.8 MHz.) of filter 37 is such as to assure rejection of the chrominance component as well as the higher frequency components associated with the clocking signals. The output of filter 37 is applied to a vertical detail processor 43, which supplies a vertical detail signal input to adder 41. It will be noted that the passband of filter 37 is narrower than the passband of filter 35, with the consequence that it introduces greater delay. Compensation for this difference in filter delay is provided by the aforementioned delay unit 29.

For the "vertical peaking" purposes of the present invention, it is not sufficient that the vertical detail signal supplied to adder 41 be translated by processor 43 with a gain appropriate to mere restoration of the removed vertical detail information. Rather, a gain greater than the gain appropriate to mere restoration is associated with signal translation by processor 43 so as to achieve vertical detail enhancement. As indicated by a drawing legend, such signal translation by processor 43 is effected in a non-inverting manner.

To appreciate the effect of the resulting vertical detail enhancement, it is appropriate at this point to consider the relative polarities of the "current line" and "preceding line" contributions to each of the inputs to adder 41. Considering, for reference, the like polarity of the "current line" and "preceding line" contributions to the combed luminance signal input as positive, the charge summer 27 can be viewed as combining positive "preceding line" information with negative "current line" information; i.e., the output of summer 27 is "preceding line" information minus "current line" information. In this context, the inverted output of unit 33 constitutes "current line" information minus "preceding line" information. In view of the non-inverting mode of operation of processor 43, the vertical detail signal input to adder 41 is thus in the form of enhanced "current line" information minus enhanced "preceding line" information.

Consider now what occurs in adder 41 when "current line" information differs from "preceding line" information, i.e., when a transition in the direction of vertical scanning is encountered. Unenhanced "current line" information from filter 35 is reinforced by enhanced "current line" information from processor 43. Unenhanced "preceding line" information from filter 35 is opposed and overcome by the opposite polarity enhanced "preceding line" information from processor 43 with the resultant a minus version of the "preceding line" information. The net effect is a transient, exaggerated swing in the direction of the "new" information, i.e., the "current line" information. Thus, when the transition in the direction of vertical scanning is black-to-white, overtravel in the white direction, i.e., an "overshoot", occurs. When the transition in the direction of vertical is white-to-black, overtravel in the black direction, i.e., an "undershoot", occurs.

The luminance signal output of adder 41 is thus provided with the asymmetrical form of vertical peaking discussed previously which, in the process of improving apparent vertical resolution or sharpness, introduces a subjectively pleasing effect of lighting from above. The output of adder 41 is supplied to a luminance signal processor 53 for development of the Y signal input to a conventional matrix 55.

The signal output at terminal C of the comb filter circuitry 11 is supplied via a delay unit 39 and an amplifier 45 to the input of a bandpass filter 47, selectively passing a combed chrominance signal component, while rejecting the low frequency vertical detail information and the high frequency components associated with the clocking signals. The output of bandpass filter 47 is passed to a conventional chrominance signal processor 49 for development of color-difference signals (R-Y, B-Y, G-Y) for application to matrix 55. Red, blue and green color signals (R, G, B), formed by combination of the Y signal with the respective color-difference signals in matrix 55, are delivered to a conventional color image reproducer 57 to effect display of a color image. In usual fashion, the Y signal contribution controls the luminance of the displayed image, while the color-difference signal contributions determine the coloring (hue and saturation) thereof. The delay provided by unit 39 adds to the delay provided by bandpass filter 47 to provide the chrominance information path with a delay matching that imposed on the luminance signal in its path to matrix 55.

It should be appreciated from the previous discussion of contribution polarities that it is appropriate, for achievement of the desired asymmetry of vertical peaking described herein, that the vertical detail input to adder 41 arrive in a form in which the enhanced "current line" contribution is of like polarity to the unenhanced contributions from the combed luminance signal. It will be appreciated that different locations for inverting and non-inverting signal translations than those of the illustrated example can be combined to achieve this result (e.g., units 31 and 33 both non-inverting, and processor 43 inverting; unit 33 and processor 43 both non-inverting and unit 31 inverting; etc.).

In a simple implementation of the present invention, associating a linear amplitude characteristic with vertical detail processor 43, the processor 43 may constitute a linear amplifier providing that amount of gain for the vertical detail signal as is required for achievement of the desired level of enhancement of the detail signal input to adder 41 relative to the signal contributions from filter 35. However, in a preferred implementation of the present invention, a non-linear amplitude characteristic is desirably associated with the signal translation effected by processor 43, as described, for example, in the copending U.S. patent application of W. Lagoni, entitled "Controllable Non-Linear Processing of Video Signals". In such an implementation, processor 43 provides the amount of gain for the vertical detail signal appropriate to vertical detail enhancement for an intermediate range of input signal amplitudes. However, for amplitudes below said range, the gain provided is that appropriate to vertical detail restoration; and for amplitudes above said range, the gain provided is less than that appropriate to vertical detail restoration. Reference may be made to said Lagoni application for a description of circuitry appropriate for use in processor 43 to achieve this result.

At output terminal R' of the chrominance signal processor 49, there appears reference oscillations of color subcarrier frequency (e.g., 3.579545 MHz.), illustratively developed by a crystal controlled oscillator phase-locked to the color synchronizing burst component of the incoming signals. A frequency tripler 51, responsive to the reference signals at terminal R', develops an output of the desired clocking frequency for delivery to the clock control input terminal CL. Illustratively, the tripler 51 may be of the advantageous form disclosed in the copending U.S. patent application of D. Pritchard, et al., entitled "Frequency Multiplier".

What is claimed is:

1. In a color television receiver subject to reception of input composite color video signals having a given line frequency, and inclusive of a luminance component, and a chrominance component sharing a portion of the band of frequencies occupied by said luminance component; signal processing apparatus comprising:
   first, second and third clocked delay lines, each having an input and an output, with the inputs of said first and second clocked delay lines receiving a first version of said input composite color video signals and the input of said third clocked delay line receiving a second version of said input composite color video signals which is phase inverted relative to said first version thereof; the signal delay provided by said second clocked delay line exceeding each of the respective signal delays provided by said first and third clocked delay lines by a line interval;
   first comb filter means for subjecting said input composite color video signals to a first frequency response characteristic exhibiting regularly spaced rejection notches recurring at odd multiples of half said line frequency, said first comb filter means comprising means for summing the output of said first clocked delay line with only the output of said second clocked delay line;
   second comb filter means for subjecting said input composite color video signals to a second frequency response characteristic exhibiting regularly spaced rejection notches recurring at even multiples of half said line frequency, said second comb filter means comprising means for summing the output of said second clocked delay line with only the output of said third clocked delay line;
   means for effecting asymmetrical vertical peaking of said luminance component in such manner that a transition-enhancing overtravel in the white direction is associated only with a transition in the direction of vertical scanning of a black-to-white type and transition-enhancing overtravel in the black direction is associated only with a transition in the direction of vertical scanning of a white-to-black type, said asymmetrical vertical peaking means comprising:
   (a) a signal adder;
   (b) a first signal path, coupled between the output of said first-named summing means and an input of said signal adder, for translating the output of said first comb filter means with a first gain; and
   (c) a second signal path, coupled between the output of said second-named summing means and an input of said adder, and including a low pass filter restricting signal passage to a band of frequencies substantially exclusive of said band portion occupied by said chrominance component, for translating at least a portion of the signal output of said second comb filter means with a second gain greater than said first gain; and
   means for utilizing the output of said adder to control the luminance of displayed color images;
   wherein one of said signal paths, to the exclusion of the other, effects its signal translation with a net polarity inversion.

2. Apparatus in accordance with claim 1 also comprising:
   band pass filter means, responsive to the output of said second-named summing means, for selectively deriving said chrominance component from the signal output of said second comb filter means; and
   p1 means for utilizing said derived chrominance component to control the hue and saturation of said displayed color images.

3. In a television receiver, signal processing apparatus for received video signals occupying a given band of frequencies comprising:
   first, second and third clocked signal transfer paths for said received video signals subject to clocking by clocking signals from a common source, said second clocked signal transfer path exhibiting a signal delay differing from each of the respective signal delays exhibited by said first and third clocked signal transfer paths by a line interval;
   first comb filter means, responsive to the outputs of said first and second clocked signal transfer paths, for providing an output representative of only the sum of current line video signals and preceding line video signals;

second comb filter means, responsive to the outputs of said second and third clocked signal transfer paths, for providing an output representative of the difference between current line video signals and preceding line video signals;

means for effecting asymmetrical vertical peaking of said video signals in such manner that a transition enhancing overtravel in the white direction is associated only with a transition in the direction of vertical scanning of a black-to-white type and a transition-enhancing overtravel in the direction of vertical scanning of a white-to-black type, said asymmetrical vertical peaking means comprising:

(a) a signal adder;

(b) a first signal path, exhibiting a given gain and a capability for passing video signal components of frequencies throughout said given band, coupled between said first comb filter means and said adder, for delivering said sum representative output to said adder with a given polarity; and (c) a second signal path, exhibiting a capability for passing only video signal components of frequencies restricted to a low frequency portion of said given band, coupled between said second comb filter means and said adder, for delivering said difference representative output to said adder in such manner that only the current line video signal contribution to said difference appears at said adder with said given polarity; said second signal path providing a gain greater than said given gain for at least portions of said difference representative output; and means for utilizing the output of said adder for controlling the luminance of a reproduced image.

4. Apparatus in accordance with claim 3 wherein said first signal path includes a first lowpass filter having a passband encompassing said given band of frequencies, wherein said second signal path includes a second lowpass filter having a passband encompassing only said low frequency band portion, and wherein said first signal path additionally includes a fourth clocked signal transfer path, subject to clocking by clocking signals from said common source, which introduces a signal delay for said sum representative output of a duration substantially equal to the difference between the respective signal delays introduced by said first and second lowpass filters.

5. Apparatus in accordance with claim 4 wherein said received video signals include a luminance component occupying said given band, and a chrominance component sharing a high frequency portion of said given band; and wherein said adder output utilizing means includes a matrix for combining said adder output with respective color difference signal inputs to said matrix to form a set of color signals; said apparatus also including:

a chrominance signal processor for deriving said color difference signal components from said chrominance component; and a third signal path, coupled between said second comb filter means and said chrominance signal processor for delivering said chrominance component to said chrominance signal processor, said third signal path including a band pass filter having a passband encompassing said high frequency band portion, and additional delay means exhibiting a signal delay of a duration substantially equal to the difference between the signal delay introduced by said band pass filter and the sum of the delays introduced by said first lowpass filter and said fourth clocked signal transfer path.

6. Apparatus in accordance with claim 4 wherein said first, second, third and fourth clocked signal transfer paths, and said first and second comb filter means are fabricated on a common monolithic integrated circuit.

* * * * *